UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PROCESS OF OBTAINING MEAT EXTRACT.

SPECIFICATION forming part of Letters Patent No. 431,730, dated July 8, 1890.

Application filed November 7, 1889. Serial No. 329,557. (No specimens.)

*To all whom it may concern:*

Be it known that I, JOSEPH VAN RUYMBEKE, a citizen of Belgium, residing at Chicago, in the county of Cook and State of Illinois, have invented a certain new and useful Improvement in Process for Making Meat Extracts, which is fully set forth in the following specification.

The water in which corned beef is cooked preparatory to canning is comparatively if not wholly worthless, although it contains valuable meat essences. It has heretofore, so far as I know, been thrown away as useless on account of its containing salt and saltpeter, &c., extracted from the meat. I have invented a process by which the water of this character is utilized and a commercially pure meat extract produced which is fit for table use and will keep for any length of time if properly put up and kept in suitable vessels.

My process consists in taking water of this character and heating it and keeping it hot to cause the grease which it may contain to separate from the water, from which I remove it, preferably, by skimming. When the grease is removed, I transfer the water to an evaporator, preferably to what is known as a "vacuum-evaporator," where I evaporate it to a consistency of from twenty to thirty per cent. of solid matter. I then transfer the soup obtained from this evaporation to suitable vessels composed partly or wholly of parchment paper or other dialysing material. I then take these vessels containing the soup-water and sink them in water until the surface of the soup-water is about on a level with the surface of the water in which the vessels are floated. The vessels are allowed to remain in the water for several hours, this water preferably being hot, or until the salt and other mineral ingredients are removed by dialysis through the parchment paper. The vessels are then removed from the water, and the soup-water, thus made substantially fresh, is returned to an evaporator and reduced to the consistency desired for use. By this process I am enabled to obtain valuable meat extracts suitable for table use, and by securing it in suitable vessels it can be kept for any length of time.

What I claim, and desire to secure by Letters Patent, is—

The process of treating water of the character described for obtaining meat extract by first heating it and removing the grease, and then evaporating it by any of the well-known systems to a consistence of from twenty to thirty per cent. of solid matter, then placing the soup thus obtained in suitable vessels composed partly or wholly of parchment paper or other dialytic material, then submerging the same in water, preferably hot, and allowing it to remain for several hours or until the soup is substantially freed from salt and other mineral ingredient, then returning to an evaporator and reducing by evaporation to the desired consistence, all substantially as specified.

JOSEPH VAN RUYMBEKE.

Witnesses:
A. M. BEST,
ALICE McIVER.